UNITED STATES PATENT OFFICE.

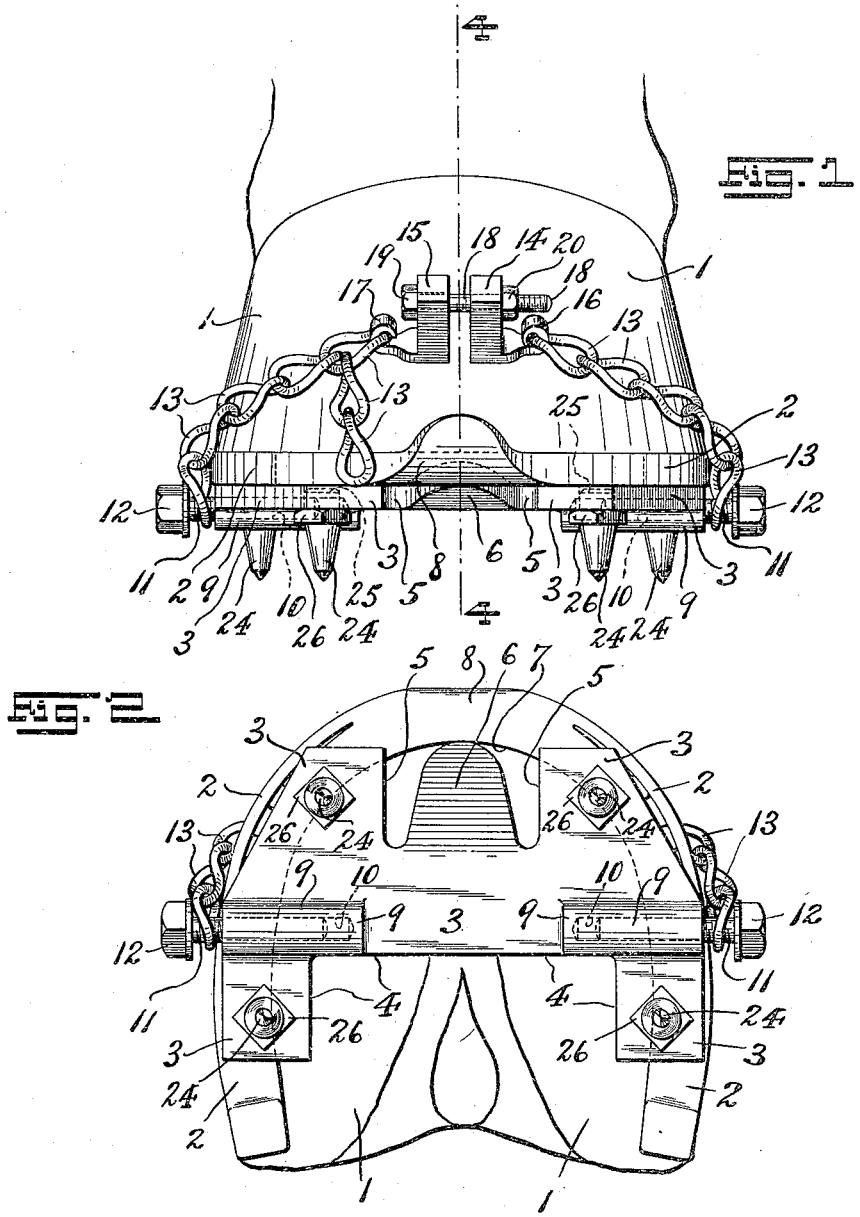

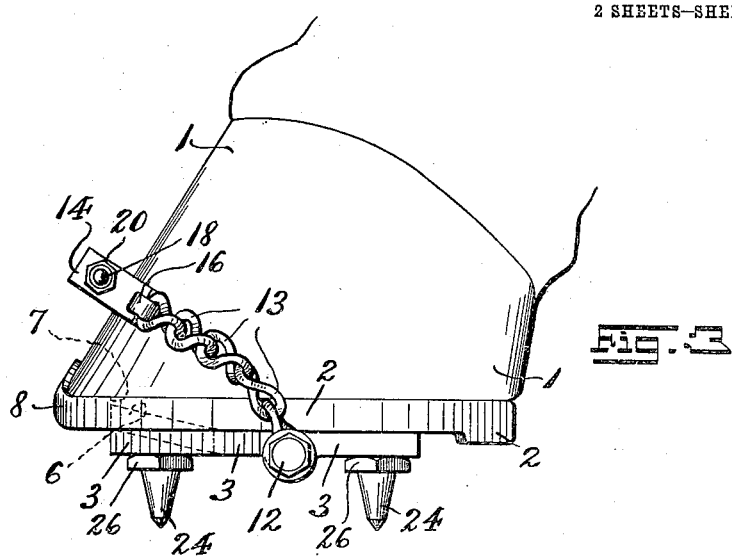
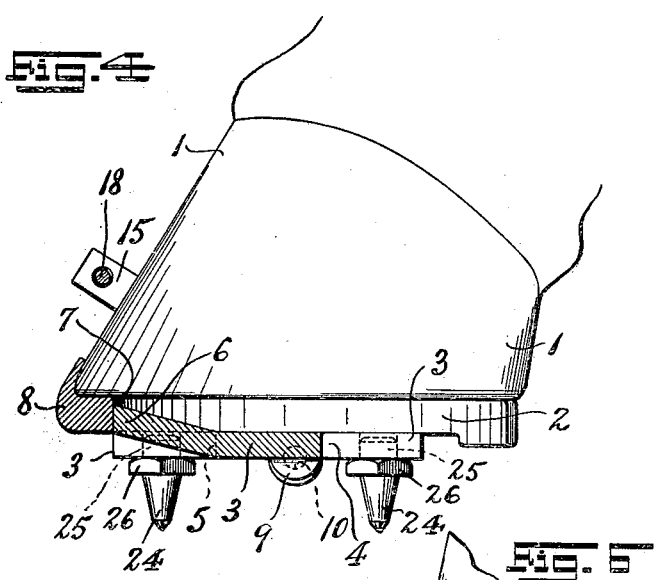
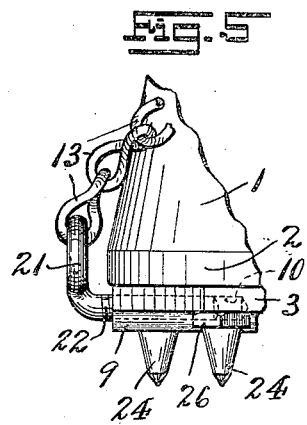
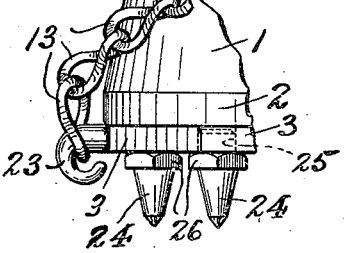

GEORGE E. SPARE, OF NEW YORK, N. Y.; ROBERT HILDRETH SPARE, OF READING, MASSACHUSETTS, EXECUTOR OF SAID GEORGE E. SPARE, DECEASED.

DETACHABLE ANTISLIPPING TREAD FOR HORSES.

1,136,903. Specification of Letters Patent. Patented Apr. 20, 1915.

Application filed June 26, 1914. Serial No. 847,381.

*To all whom it may concern:*

Be it known that I, GEORGE E. SPARE, a citizen of the United States, residing at New York, in the county of New York and State of New York, have invented certain new and useful Improvements in Detachable Antislipping Treads for Horses; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates, generally, to improvements in detachable anti-slipping treads for attachment to the shod hoofs of horses and other draft animals; and the present invention has reference, more particularly, to a novel anti-slipping tread which may be quickly and easily attached or detached over the ordinary horse-shoe and thus firmly secured to the hoof of the animal, so that the animal may easily and firmly tread upon icy and slippery roads and pavements without danger of slipping, whereby the animal is rendered surefooted under the most adverse road conditions, and relieved of the bodily strains consequent upon traveling over icy or slippery roads or pavements with worn or dull shoes.

The present invention has for its principal object to provide a novel and simply constructed anti-slipping tread of great strength and durability, and so arranged as to be easily and quickly attached or detached from the shod hoofs of the animal; the same being further provided with a novel construction and arrangement of attaching means whereby its attachment is rendered secure and all liability to accidental detachment eliminated, and which, at the same time, employs but few parts easily adjustable to the hoof and all so constructed as to produce a comparatively light weight device without expense of strength and durability.

Other objects of this invention, not at this time more particularly enumerated, will be clearly understood from the following detailed description of the present invention.

With the various objects of the present invention in view, the invention consists, primarily, in the novel detachable anti-slipping tread hereinafter set forth; and, the invention consists, furthermore, in the novel arrangements and combinations of the various devices and parts, as well as in the details of the construction of the said parts, all of which will be more fully described in the following specification, and then finally embodied in the claims which are appended to and which form an essential part of this specification.

The invention is clearly illustrated in the accompanying drawings, in which:—

Figure 1 is a front elevation of the shod hoof of a horse equipped with the novel detachable anti-slipping tread made according to and embodying the principles of my present invention; Fig. 2 is a bottom plan view of the same; Fig. 3 is a side elevation of the same; and Fig. 4 is a vertical longitudinal section of the anti-slipping tread and the horse-shoe over which it is secured, the hoof of the horse being illustrated in elevation, said section being taken on line 4—4 in said Fig. 1. Fig. 5 is a detail front elevation of a portion of the shod hoof equipped with the novel anti-slipping tread, but illustrating a modified form of anchor point for attaching the flexible tie devices to the tread-plate of the device; and Fig. 6 illustrates still another modified form of anchor point for attaching the flexible tie devices to the tread-plate of the device.

Similar characters of reference are employed in all of the hereinafter described views to indicate corresponding parts.

Referring now to the said drawings the reference character 1 indicates the hoof of a horse, the same being shod with any of the ordinary kinds or types of horse-shoe, as indicated by the reference character 2.

The reference character 3 indicates a main body or tread-plate which is adapted to be registered upon the bottom of the horseshoe 2, the same being conveniently shaped so as to rest upon the horse-shoe and extend, preferably, within the limits of the outer circumference or edges of the said horseshoe. The rear portion of said main body or tread-plate 3 may be cutaway as at 4 if desired for the sake of securing lightness or a reduction of the weight of said body or tread-plate. The forward edge of said main body or tread-plate is provided with inwardly extending cutaway portions or slots 5 so disposed as to bound a centrally located and forwardly extending tongue or butt-piece 6, the same being inclined upwardly so that its free end butts against the inner circumference or back 7 of the toe portion 8 of the horse-shoe 2, and as thus engaged prevents any forward movement or sliding of the said main-body or tread-plate 3, whereby the same is prevented from moving longitudinally forward and out of normal association with the bottom of said horse-shoe 2. Extending inwardly and laterally from the side marginal edges of said main body or tread-plate 3 are a pair of ribs or bosses 9, the same being located or spaced considerably to the rear of the forward marginal edges of said main body or tread-plate 3. Each rib or boss 9 is provided with an inwardly extending internally screw threaded opening 10. Screwing into each opening 10 is a bolt or its equivalent 11, the same having a suitable head 12 for manipulating the same. Said bolts 11 provide outwardly projecting anchor points upon which are connected the fixed ends of a pair of flexible tie-members 13, the said tie-members being preferably in the form of a chain, which provides sufficient flexibility as well as a great degree of strength. The said tie-members 13 thus provided extend upwardly and laterally across the face of the hoof 1, and the free ends of the same are brought together and secured by a suitable coupling device in such position. When said tie-members are thus secured together they serve not only to bind said main body or tread-plate 3 in normal and operative association with the shod hoof of the horse, but also prevent any rearward or lateral movement or sliding of said main body or tread-plate 3, whereby the same is prevented from moving longitudinally rearward or from moving sidewise or laterally out of normal association with the bottom of said horse-shoe 2.

It is preferable to so construct the coupling device by means of which the free ends of said tie-members 13 are joined together, that the latter can be adjusted to the size of the hoof 1, and so that all slack may be taken up whereby the tie-members are rigidly bound across the face of the hoof 1 in a secure manner, and free from any liability to become loosened.

Of course it will be apparent that a coupling-device serving the above purposes may be made in various forms, and the detail construction thereof variously modified, hence the construction of such a device as illustrated in the accompanying drawings, and as hereinafter described must be considered as merely illustrative of one form of such coupling-device, and it will be understood that I do not limit myself or the scope of this invention to the use of the particular coupling device shown and described.

The form of coupling-device I have chosen as illustrative of the coupling-device forming an element of my present invention comprises a pair of blocks 14 and 15. From the lower end of the block 14 projects an eye-piece 16 in the opening of which is secured the free end of one of said tie-members 13. From the lower end of the block 15 projects a hook-member 17 upon which may be connected selectively any one of the links of the chain forming the free end of the other of said tie-members 13, so that the tie-members are properly arranged to extend over the front or face of the hoof 1. Each block 14 and 15 is provided with an opening which when the blocks are registered opposite each other are alined together, and through which a coupling-bolt 18 is passed, the head 19 engaging one of said blocks. On the free end of said bolt 18 is secured a nut 20 adapted to engage the other block, and it will be apparent that when the nut 20 is screwed tightly home it will draw the two blocks together, and consequently will cause the slack of the tie-members 13 to be taken up so that the same are rigidly bound in operative position across the face of the hoof 1, and therefore the tread-plate 3 is securely bound in normal position upon the bottom of the horse shoe 2.

Referring again to the anchor bolts 11, it will be apparent that by screwing the same in or out, the same may be brought in proper laterally projecting position so as to extend slightly beyond the sides of the shod-hoof, and therefore may be caused to compensate for any difference in the width of the shod-hoof relative to the width of the main body or tread-plate 3.

Referring now to Fig. 5 of the drawings I have illustrated a slightly modified form of anchor points for the tie-members 13, and in place of the headed bolts 11, I have provided a ring-shaped member 21 to which the fixed ends of the tie-members 13 are secured. Each ring shaped member 21 is further provided with a laterally extending screw threaded shank 22 which screws into each opening 10 of the ribs or bosses 9 of said main body or tread-plate 3. This construction possesses the feature of adjustment laterally as does the bolts 11, but also prevents any loosening of the anchor points by rotation or unscrewing since the ring-shaped members 21 are maintained against turning by the pull of the tie-members 13.

In Fig. 6 of the drawings I have shown the anchor points for the tie-members 13 constructed in the form of hook-members 23 integrally formed in connection with said main body or tread-plate 3. This construction may be preferred to the above described constructions in some instances. The said main body or tread-plate 3 is provided with a plurality of suitable sharpened calks 24, the same being properly located so as to project from the under surface of said main body or tread-plate. The said calks 24 are preferably made and arranged so as to be removable from said main body or tread-plate 3, so that the same can be removed and sharpened, or new calks replaced when the old are worn out. To this end the calks 24 are provided with screw-threaded shanks 25 which screw into said main body or tread-plate 3, and each calk is provided with a nut-shaped portion 26 whereby a wrench can be applied thereto for the purpose of attaching and detaching said calks to and from said main body or tread-plate 3.

From the above detailed description it will be clearly apparent that the present invention provides a very simple, light weight, strong and durable anti-slipping tread easily and quickly applied to or removed from the shod hoof of the horse. The attaching or detaching operations are accomplished by means of a wrench alone, and when once adjusted to the hoof can be taken on or off in a single operation, namely the loosening or uncoupling of the coupling device joining together the tie-members 13. The tie-members 13 operating in conjunction with the butt-piece 6 alone effecting an exceedingly strong immovable connection of the tread-plate with the shod hoof, which is proof against accidental displacement.

The calks 24 provide a sharp tread which prevents slipping, and at the same time said tread plate 3 so protects the shod hoof that the same is freed from liability of balling up or packing dirt, snow and the like on the bottom of the hoof.

I am aware that some changes may be made in the general arrangements and combinations of the various devices and parts of the novel anti-slipping tread, as well as in the details of the construction of the said parts, without departing from the scope of the present invention as set forth in the foregoing specification, and as defined in the claims which are appended thereto. Hence, I do not limit my present invention to the exact arrangements and combinations of the various devices and parts as described in the said specification, nor do I confine myself to the exact details of the construction of the said parts as illustrated in the accompanying drawings.

I claim:—

1. In a device of the kind described, a tread-plate provided with anti-slipping means adapted to be registered against the bottom of the shod hoof of a horse, and adapted to extend within the limits of the outer circumference of the shod hoof, a forwardly extending butt-piece connected with said tread-plate, the free end of said butt-piece being positioned to butt against the toe of the horse-shoe, and means extending from the side portions of said tread-plate adapted to be secured over the face of the hoof to retain said tread-plate in operative position.

2. In a device of the kind described, a tread-plate provided with anti-slipping means adapted to register against the bottom of the shod hoof of a horse so as to extend over and cover the hollow portion of the bottom of the horse's hoof, means connected with said tread-plate adapted to engage a portion of the horse-shoe to prevent longitudinal displacement of said tread-plate in one direction, and a tie means connected with said tread-plate and adapted to extend over the face of the hoof to prevent displacement of said tread-plate in other directions.

3. In a device of the kind described, a tread-plate extending under the shod hoof, and provided with a butt-piece inclined upwardly to butt against the inner side of the horse-shoe back of its toe, laterally extending flexible tie means connected with the side portions of said tread-plate so as to be secured over the face of the hoof, and a plurality of sharpened calks projecting from the bottom surface of said tread-plate.

4. In a device of the kind described, a tread-plate adapted to extend over the shoe of the shod hoof, a butt-piece connected with said tread-plate, the free end of the same being positioned to butt against the inner side of the shoe back of its toe, flexible tie-members, means for securing said flexible tie-members to the side portions of said tread-plate, a coupling-device for firmly securing the free ends of said tie-members together so that the same extend over the face of the hoof, and a plurality of sharpened calks projecting from the under surface of said tread-plate.

5. In a device of the kind described, a tread-plate adapted to extend over the shoe of the shod hoof, a butt-piece connected with said tread-plate, the free end of the same being positioned to butt against the inner side of the shoe back of its toe, flexible tie-members, means for securing said flexible tie-members to the side portions of said tread-plate, a coupling-device for firmly securing the free ends of said tie-members together so that the same extend over the face of the hoof, and a plurality of anti-slipping calks detachably connected with said tread-plate so as to project from the bottom thereof.

6. In a device of the kind described, a tread-plate adapted to extend over the shoe of the shod hoof, a forwardly projecting upwardly inclined butt-piece integrally connected with said tread-plate, the free end of said butt-piece butting against the inner side of the shoe back of its toe, a plurality of sharpened calks projecting from the bottom of said tread-plate, and means connected with said tread-plate adapted to be secured over the face of the hoof to prevent displacement of said tread-plate.

7. In a device of the kind described, a tread-plate adapted to extend over the shoe of the shod hoof, a forwardly projecting upwardly inclined butt-piece integrally connected with said tread-plate, the free end of said butt-piece butting against the inner side of the shoe back of its toe, a plurality of sharpened calks projecting from the bottom of said tread-plate, and means connected with said tread-plate adapted to be secured over the face of the hoof to prevent displacement of said tread-plate, comprising anchor-points, means for connecting said anchor-points with said tread-plate so that the same project laterally from the sides thereof, flexible tie-members secured to each anchor point, and means for firmly securing the free ends of said tie-members together over the face of the hoof.

8. In a device of the kind described, a tread-plate adapted to extend over the shoe of the shod hoof, a forwardly projecting upwardly inclined butt-piece integrally connected with said tread-plate, the free end of said butt-piece butting against the inner side of the shoe back of its toe, a plurality of sharpened calks projecting from the bottom of said tread-plate, and means connected with said tread-plate adapted to be secured over the face of the hoof to prevent displacement of said tread-plate, comprising anchor-points, means for connecting said anchor-points with said tread-plate so that the same project laterally from the sides thereof, flexible tie-members secured to each anchor-point, and means for firmly securing the free ends of said tie-members together over the face of the hoof, said means comprising a block connected with the free end of each tie-member, and a bolt and nut for securing said blocks together.

In testimony, that I claim the invention set forth above I have hereunto set my hand this 24th day of June, 1914.

GEORGE E. SPARE.

Witnesses:
GEORGE D. RICHARDS,
MAYBELLE MCADOO.

Copies of this patent may be obtained for five cents each, by addressing the "Commissioner of Patents, Washington, D. C."